Oct. 14, 1941. H. C. MUELLER Re. 21,924

DAMPER CONTROL FOR UNIT HEATERS

Original Filed Sept. 11, 1939

BEST AVAILABLE COPY

INVENTOR.
Harald C. Mueller,
BY Chas. T. Murray
ATTORNEY.

Reissued Oct. 14, 1941

Re. 21,924

UNITED STATES PATENT OFFICE 21,924

DAMPER CONTROL FOR UNIT HEATERS

Harald C. Mueller, Winnetka, Ill., assignor to The Powers Regulator Company, Chicago, Ill., a corporation of Illinois Original No. 2,213,092, dated August 27, 1940, Serial No. 294,267, September 11, 1939. Application for reissue May 28, 1941, Serial No. 395,641

7 Claims. (Cl. 236—38)

My invention relates to heating appliances and particularly to a unit heater and ventilator having novel means for controlling the fresh air intake damper commonly used therewith.

In the operation of heating appliances it has been the practice for many years to provide means acting to close the fresh air inlet whenever the operation of the circulating fan is interrupted. This has commonly been accomplished by providing an electro-pneumatic valve, in series with the fan motor, the valve having the function of venting the damper motor whenever the current to the fan motor is interrupted.

An arrangement of this character involves considerable wiring and other complications, and it is the object of this invention to provide means for accomplishing the desired result without the use of electrical connections.

In order to interrupt the supply of air from the thermostat to the damper motor and to vent the motor, I provide a simple positively acting valve operable by either the separate or combined effects of static and velocity pressure. When the fan is in operation the pressure within the unit heater casing is slightly below atmospheric, while the velocity pressure, made effective through a Pitot tube, is slightly above atmospheric. These forces acting on opposite sides of a diaphragm supply ample force for actuating a valve that serves to accomplish the desired purpose.

Figure 1:
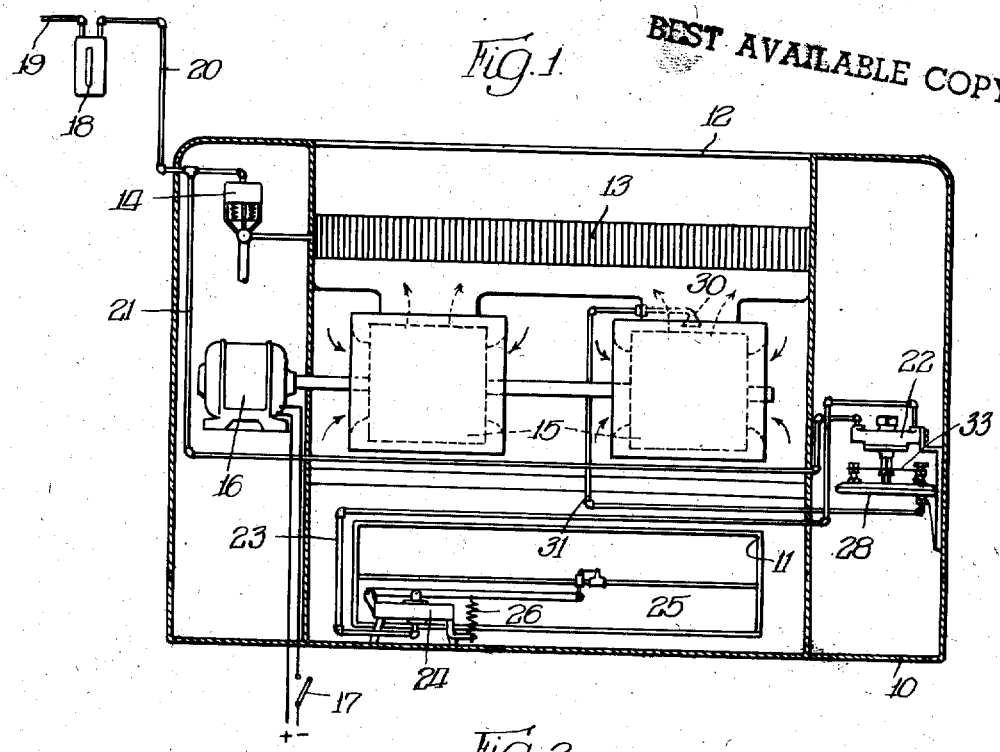
Figure 2:
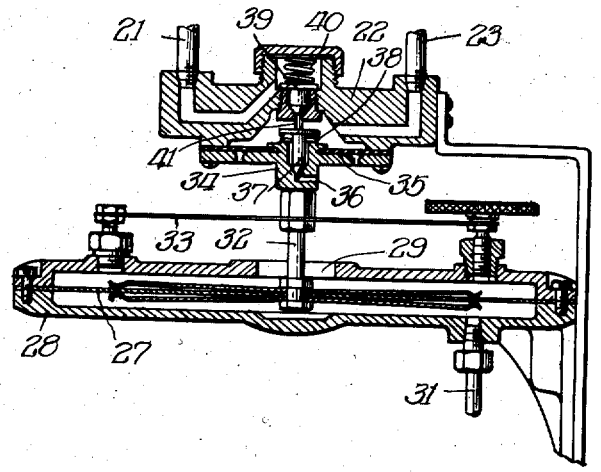

The invention will be more readily understood by reference to the accompanying drawing, in which, Fig. 1 is a sectional view through a unit heater arranged in accordance with my invention; and, Fig. 2 is an enlarged sectional view through a valve arrangement such as contemplated.

In the drawing I have indicated a unit heater casing 10 having a fresh air inlet opening 11 and a heated air outlet 12. Within the casing I provide a heat exchange element 13, the supply of heat to which is controlled by a fluid pressure motor valve 14. A pair of blower fans 15 are operated by an electric motor 16, an operating switch 17 for which may be provided at a remote point. A thermostat 18 of common form may be provided in the room to be heated, a supply of air under pressure being delivered thereto through a pipe 19. Air under pressure that passes through said thermostat is carried through pipe 20 to the valve 14, a branch pipe 21 conveying the air under pressure to the three-way valve 22, best shown in Fig. 2. The air that is permitted to pass said valve 22 is carried through pipe 23 to a damper motor 24 so arranged that a damper 25 controlling the fresh air inlet is held in open position by the pressure admitted through said pipe 23. Spring means 26 serve to close said damper.

Associated with said valve 23 is a diaphragm 27 held within a casing 28. The upper side of the diaphragm 27 is open to the space within the unit heater through the opening 29 in the casing. The lower side of the diaphragm is in communication with a Pitot tube 30 located in the air stream from one of the fans 15 through a pipe 31.

A stem 32 connected to the diaphragm 27 is engaged by a light, flexible spring 33 and contacts a button 34 forming a part of the valve 22. This button is carried on a diaphragm 35, the button having an exhaust passage 36 controlled by a valve 37. A light coiled spring 38 tends to unseat the valve 37. Mounted in the valve body 22 is a second valve 39 seated by a spring 40 that is stronger than the spring 38, this valve controlling the passage of air from the pipe 21 to the pipe 23 through the appropriate passages. A pin 41 provides a thrust connection between valves 37 and 39.

In practice, the fan motors being in operation, a static pressure somewhat less than atmospheric will act on the upper surface of the diaphragm 27 and, through the Pitot tube 30, a pressure somewhat in excess of atmospheric will be exerted on the lower area of the diaphragm. This will cause an upward movement of the stem 32 and an upward movement of the button 34. This will unseat the valve 39 and permit air pressure in the pipe 21 to be exerted on the damper motor 24 to maintain the damper in open position. Upon interruption of the fan motor the static pressure within the heater casing will return to normal and the velocity pressure theretofore exerted on the lower side of the diaphragm 27 will be reduced, thus allowing the diaphragm to be returned to such position that the valve 39 will be closed and the valve 37 will be opened. This will result in interruption of the supply of air under pressure to the damper motor and will vent the air within the damper motor through the valve 37, thus permitting the spring 26 to close the damper motor. Thus the damper will be closed whenever the fans are not in operation, this being accomplished without the use of electrical apparatus of any kind.

While I have shown means providing for operation of the diaphragm by the combined effect of the static and velocity pressures, it is possible that the result might be secured by the use of either of said pressures and the invention should be so considered.

I claim:

1. In a unit heater having a casing and a fresh air intake damper and motor, the combination of thermostatically controlled air-pressure-means acting on said motor for maintaining said damper in open position, a blower for circulating air through said casing, a three-way valve for alternately admitting said air under pressure to said motor and exhausting said air to permit said damper to close, and means for operating said three-way valve, said means including a diaphragm, and a Pitot tube located in the air stream from said blower, one side of said diaphragm being affected by the static pressure in said casing and the other side by the pressure developed by said Pitot tube.

2. In a unit heater having a casing and a fresh air intake damper and motor, the combination of thermostatically-controlled air-pressure-means acting on said motor for maintaining said damper in open position, a blower for circulating air through said casing, a three-way valve for alternately admitting said air under pressure to said motor and exhausting said air to permit said damper to close, and means for operating said three-way valve, said means including a diaphragm, and a Pitot tube located in the air stream from said blower, one side of said diaphragm being affected by the minus static pressure in said casing and the other side by the plus pressure developed by said Pitot tube.

3. In a unit heater, the combination of a casing having an outlet and a fresh air inlet, a damper for controlling said inlet, a motor for controlling said damper, a thermostat for controlling air pressure acting on said damper motor and so arranged that pressure is necessary to maintain said damper in open position, a fan for causing the movement of air through said casing, a three-way valve for alternately admitting said air under pressure to said motor and exhausting said air to permit said damper to close, and means for operating said three-way valve, said means including a diaphragm and a Pitot tube located in the air stream from said blower and connected to one side of said diaphragm, said diaphragm being affected by the pressure developed by said Pitot tube.

4. In a unit heater, the combination of a casing having an outlet and a fresh air inlet, a damper for controlling said inlet, a motor for controlling said damper, a thermostat for controlling air pressure acting on said damper motor and so arranged that pressure is necessary to maintain said damper in open position, a fan for causing the movement of air through said casing, a three-way valve for alternately admitting said air under pressure to said motor and exhausting said air to permit said damper to close, and means for operating said three-way valve, said means including a diaphragm and a Pitot tube located in the air stream from said blower, connected to one side of said diaphragm, one side of said diaphragm being affected by the pressure developed by said Pitot tube, and the other side being affected by the minus static pressure in said casing.

5. In a unit heater having a casing and a fresh air intake damper and motor, the combination of thermostatically controlled air-pressure-means acting on said motor for maintaining said damper in open position, a blower for circulating air through said casing, a three-way valve for alternately admitting said air under pressure to said motor and exhausting said air to permit said damper to close, and means for operating said three-way valve, said means including a diaphragm, subject to the pressure within the casing, one side of said diaphragm being affected by the static pressure in the casing, the pressure in said casing being below atmospheric during the operation of said blower and being restored to atmospheric with consequent change in the pressure effective on said diaphragm when the operation of the blower is interrupted.

6. In a unit heater having a casing and a fresh air intake damper and motor, the combination of thermostatically controlled air-pressure-means acting on said motor for maintaining said damper in open position, a blower for circulating air through said casing, a three-way valve for alternately admitting said air under pressure to said motor and exhausting said air to permit said damper to close, and means for operating said three-way valve, said means including a diaphragm, within the casing, one side of said diaphragm being affected by the static pressure in said casing being below atmospheric during the operation of said blower and being restored to atmospheric with consequent change in the pressure effective on said diaphragm when the operation of the blower is interrupted.

7. In a heating device having a casing and a fresh air intake damper and motor, the combination of air-pressure-means acting on said motor for maintaining said damper in one position, a blower for circulating air through said casing, a three-way valve for alternately admitting said air under pressure to said motor and exhausting said air to change the position of said damper, and means for operating said three-way valve, said means including a diaphragm, the position of said diaphragm being controlled by air pressure conditions developed by said blower, whereby during operations of the blower the three-way valve is positioned to maintain said damper in open position and positioned to effect closing of the damper when the blower is idle.

HARALD C. MUELLER.